(12) United States Patent
Yan et al.

(10) Patent No.: US 8,122,156 B2
(45) Date of Patent: Feb. 21, 2012

(54) METHOD AND COMPUTER FOR PROCESSING AN OPERATION COMMAND IN A COMPUTER

(75) Inventors: Yiqiang Yan, Beijing (CN); Shaoping Peng, Beijing (CN); Bo Liu, Beijing (CN); Xiaohua Jiang, Beijing (CN); Chengkun Sun, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 279 days.

(21) Appl. No.: 12/352,690

(22) Filed: Jan. 13, 2009

(65) Prior Publication Data

US 2009/0183013 A1 Jul. 16, 2009

(30) Foreign Application Priority Data

Jan. 14, 2008 (CN) .......................... 2008 1 0056182

(51) Int. Cl.
*G06F 3/00* (2006.01)
*G06F 13/00* (2006.01)
(52) U.S. Cl. ......... 710/5; 710/1; 710/2; 710/36; 710/37; 710/38; 710/104; 712/1; 712/34; 713/300; 713/310; 719/321; 719/323; 719/327
(58) Field of Classification Search .................. None
See application file for complete search history.

(56) References Cited

U.S. PATENT DOCUMENTS

| | | | | |
|---|---|---|---|---|
| 6,141,021 A * | 10/2000 | Bickford et al. | ............. | 345/503 |
| 6,321,287 B1 * | 11/2001 | Rao et al. | ..................... | 710/260 |
| 6,675,233 B1 * | 1/2004 | Du et al. | .......................... | 710/14 |
| 6,803,912 B1 * | 10/2004 | Mark et al. | .................... | 345/427 |
| 7,236,482 B2 * | 6/2007 | Chen | ............................. | 370/338 |
| 7,844,848 B1 * | 11/2010 | Hobbs | ........................... | 713/400 |
| 2005/0251605 A1 * | 11/2005 | Oak et al. | ...................... | 710/260 |
| 2005/0273525 A1 * | 12/2005 | Anderson | ...................... | 710/36 |
| 2009/0183013 A1 * | 7/2009 | Yan et al. | ..................... | 713/300 |

FOREIGN PATENT DOCUMENTS

CN 2763895 Y 3/2006

* cited by examiner

*Primary Examiner* — Tanh Nguyen

(74) *Attorney, Agent, or Firm* — Dickstein Shapiro LLP

(57) ABSTRACT

A method is provided for processing operation command in a computer that has a display and a host which includes a first display processing unit for local displaying and a second display processing unit for remote displaying. The operation command is from a remote data processing terminal. The method includes: receiving a first operation command from the data processing terminal, the first operation command being a power-on command; performing power-on of the computer, shielding the first display processing unit and loading only a driver of the second display processing unit according to first operation command; receiving a second operation command from the data processing terminal, the second operation command being not a power-on command; executing the second operation command to obtain operation results, the operation results being image data processed by the second display processing unit, and sending the operation results to the remote data processing terminal, for remote displaying.

6 Claims, 2 Drawing Sheets

METHOD AND COMPUTER FOR PROCESSING AN OPERATION COMMAND IN A COMPUTER

BACKGROUND OF THE INVENTION

1. Field of Invention

The invention relates to a control technique for a remote apparatus, especially to a method and computer for processing an operation command in a computer.

2. Description of Prior Art

As personal computers are constantly going widespread, it is becoming a part of people's daily life to process information with a computer, for example, surfing on-line, multimedia play, web TV, programming, graph plotting, editing various files, etc. non of which can go away from a computer. A personal computer has become necessity of life. With maturity and continuous progress of a computer technology, there is rapid development in a computer communication technology. The application of technologies such as Internet, LAN (Local Area Network), MAN (Metropolitan Area Network), etc. greatly facilitates people to share and exchange information. People can realize information communication with others through intelligent terminals, e.g. a computer, etc., wherever network exists.

In order to achieve an object of processing information at any time, some mobile terminals are developed, e.g. notebook PC, mobile PC, Personal Digital Assistant (PDA), cell phone, etc. A mobile terminal indeed realizes the object of both being carried around and processing information at any time. But processing ability of a mobile terminal is weaker than that of a desktop computer due to restriction of its size and weight. Even a notebook PC can not achieve the processing function of a desktop computer. It is still quite inconvenient to carry a notebook PC around anytime because of its relatively large size and heavy weight. If a user's own personal computer can be manipulated through a network at any time, information can still be processed anytime without the intelligent terminal described above being carried around.

At present, a diskless workstation is proposed to implement a remote control technique. A client of the diskless workstation is started up via a network, and configuration of the client is the same as a normal PC except that the client does not have a local hard disk, a floppy drive, CD-ROM or other auxiliary devices. A system for supporting client access is provided on a network server, through which the client obtains corresponding processing data. The client in the diskless workstation has a high configuration and needs to be specifically networked, therefore it is expensive and inconvenient for the client to be carried around or fully impossible to be carried.

A thin client and a PC blade widely used at present mostly employ RDP (Remote Desktop Protocol) architecture or ICA (Independent Computing Architecture). The thin client is inexpensive and able to support most of user actions using connections like a network and USB, etc. However, a server has to remain in a power-on state. A terminal does not have a function of initiating the server and can not control actions prior to the server entering into an OS (Operating System), e.g. to enter a power-on keyword, modify BIOS setup, select an OS, etc.

SUMMARY OF THE INVENTION

Accordingly, it is a main object of the invention to provide a method and computer for processing an operation command in a computer, wherein manipulation of the computer can be implemented by an I/O terminal being carried around, which can cause the same effect as that of a locally used apparatus.

In order to achieve the object above, technical solutions of the invention are to be implemented as follows:

A method for processing operation command in a computer, said computer comprises a display and a host which includes a first display processing unit and a second display processing unit therein, said operation command is from a remote data processing terminal, said method comprises:

receiving the operation command from said data processing terminal;

shielding said first display processing unit according to said operation command;

executing said operation command to obtain operation results;

wherein said shielding said first display processing unit further comprises steps of:

detecting said first display processing unit and said second display processing unit, loading only a driver of said second display processing unit.

Herein, the method further comprises:

sending said operation results to said remote data processing terminal after said operation results are obtained.

Herein, the method further comprises:

after a power-on command is received, short-connecting a PS-ON pin of the computer's power supply with a grounding pin or sending a grounding signal to said PS-ON pin, and causing a PW-OK pin level to be lowered, to thus turn on a power-on circuit.

Herein, said operation results are data images processed by said second display processing unit.

A computer comprises a display and a host which includes a first display processing unit and a second display processing unit, and the computer further comprises:

a reception module, for receiving operation command from a remote data processing terminal;

a shielding module, for shielding said first display processing unit;

an execution module, for executing said operation command to obtain operation results;

wherein said shielding module comprises a detection module for detecting said first display processing unit and said second display processing unit and a loading module for loading only a driver of said second display processing unit.

Herein, said computer further comprises:

a sending module, for sending said operation results to said remote data processing terminal.

Wherein said computer further comprises:

a power-on module, for short-connecting a PS-ON pin of said computer's power supply with a grounding pin or sending a grounding signal to said PS-ON pin, and causing a PW-OK pin level to be lowered to thus conduct a power-on circuit, after receiving a power-on command.

Herein, said computer further comprises:

an operation command determination module, for determining whether the operation command received by said reception module is a power-on command, and if so, triggering said shielding module.

At present, no technique for supporting remotely manipulation of computer exists. Thus, it is necessary for a user to have to carry an intelligent apparatus around with him in order to realize real-time information processing. Many information processing functions can not be fully implemented because of restriction on processing ability of a mobile apparatus. The invention can realize manipulation of a specified computer via a remote processing terminal, i.e. a remote I/O terminal, which can cause the same effect as that of a locally operated computer. Additionally, in consideration of the factor of information security, when remote manipulation is performed, local image output interfaces are automatically shielded. A user can realize manipulation of a remote computer via a remote processing terminal carried around with him wherever network exists. This is simply realizable, cost effective and convenient to use.

DETAILED DESCRIPTION OF PREFERRED EMBODIMENTS

The invent will be described in details below in combination with the accompanied drawings.

Figure 1:
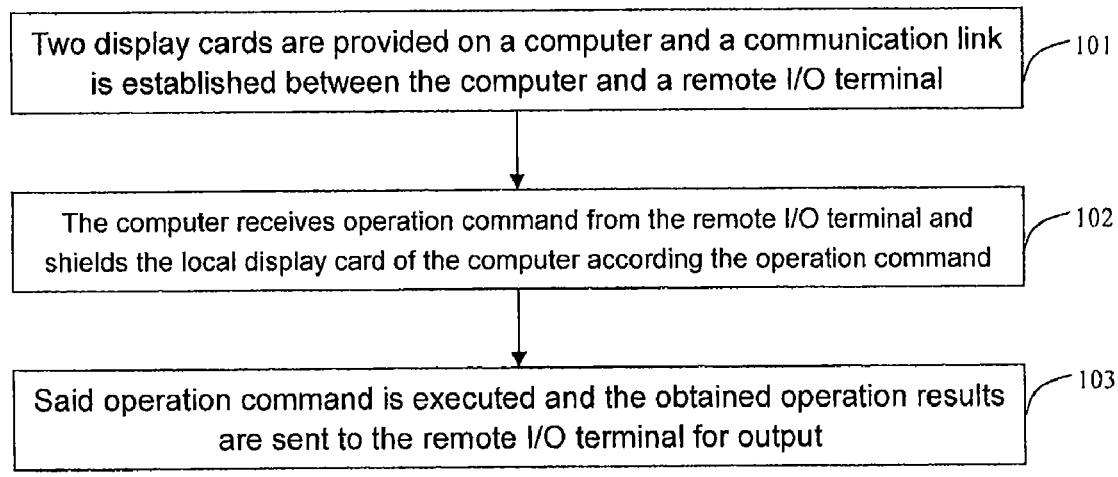
FIG. 1 is a flowchart of the method for processing an operation command in a computer according to the invention.

FIG. 1 is a flowchart of the method for processing operation command in a computer according to the invention. As illustrated in FIG. 1, the method for processing the operation command in a computer according to the invention comprises:

Step 101: two display cards are provided on the computer. A communication link is established between the computer and a remote I/O terminal. A first display processing unit and a second display processing unit, i.e. two display cards, are provided on the computer, wherein the first display card is a computer's on-board display card for processing local display image data, and the second display card is an extended display card specifically for processing display image data sent to the remote I/O terminal. Additionally, communication modules for communicating with each other are provided both on the computer and on the remote I/O terminal. Here, the communication modules can be network cards, modems for supporting voice dialing, etc. It is to be noted that the communication module on the computer is required to support a passive operation mode, e.g. it is provided with an accumulator supply itself in order to still work after the computer is shut down. The communication module on the computer can also be individually supplied by a regular power supply, as long as it can be guaranteed that the communication module on the computer still has a working power supply after the computer is shut down. The remote I/O terminal is a pure I/O terminal and has hardly any information processing ability, except for the communication module provided thereon. The remote I/O terminal can be a touch screen, and can also be a combination of a keyboard and a display screen, a combination of a mouse and a display screen, a combination of a touch pad and a display screen, or a combination of a mouse, a keyboard and a display screen. The remote I/O terminal is connected with the computer through a network links such as Internet, LAN, MAN, etc.

Step 102: the computer receives the operation command from the remote I/O terminal and shields the local display card according to the operation command. After the user remote I/O terminal accesses to the network, it establishes a link with the computer according the network address of the computer. After the remote I/O terminal completes identity authentication, the operation command on the computer can be entered via the remote I/O terminal, packaged by the communication module, and then sent through the network to the communication module of the computer. The communication module of the computer parses the operation command and forwards it to a local processing center of the computer. Here, the operation command can be any command including a power-on command or shut-down command, any command entered by any keyboard or a combination keyboards, and any command entered by a touch pad, touch screen or a mouse. It is to be noted that the computer, when receiving the operation command, determines whether the operation command is a power-on command, and if so, executes this command, i.e. power on the computer, and shields the local display card at the same time. That is to say, if the computer is powered on via the remote I/O terminal, the local display card is shielded upon power-on. After a power-on command sent from the network side is received by the computer, a PS-ON pin of the computer's power supply is short-connected with a grounding pin or a grounding signal is sent to said PS-ON pin, and a PW-OK pin level is lowered to thus turn on a power-on circuit. The invention supports a plurality of modes, e.g. wakening of the network card, etc., the principles of implementation of which are the same and the description of which is omitted here. After the computer is powered, BIOS performs a power-on self-check. When the two display cards of the computer are detected, only a driver of the display card specifically for processing display image data sent to the remote I/O terminal is loaded in the OS, i.e. the local display card is shielded.

Step 103: said operation command is executed and the obtained operation results are sent to the remote I/O terminal to be output. After the local operation command processing center of the computer receives the operation command, it executes it as a local operation command to obtain execution results. After the execution results are packaged by the communication module of the computer, they are sent to the remote I/O terminal. Here, the execution results are mainly the data, e.g. a display image, audio data, etc., that is processed by the display card specifically for processing display image data sent to the remote I/O terminal after the operation command is executed by the processing center of the computer. The display image herein refers to a desktop display image. In order to improve effect of use of the invention and effect of use for a user, before the communication module of the computer sends the execution results, these execution results are required to be compressed to improve efficiency of network transmission. After the remote I/O terminal receives the execution results, the execution results are directly displayed by a display terminal or played by an audio output port after being parsed.

Figure 2:
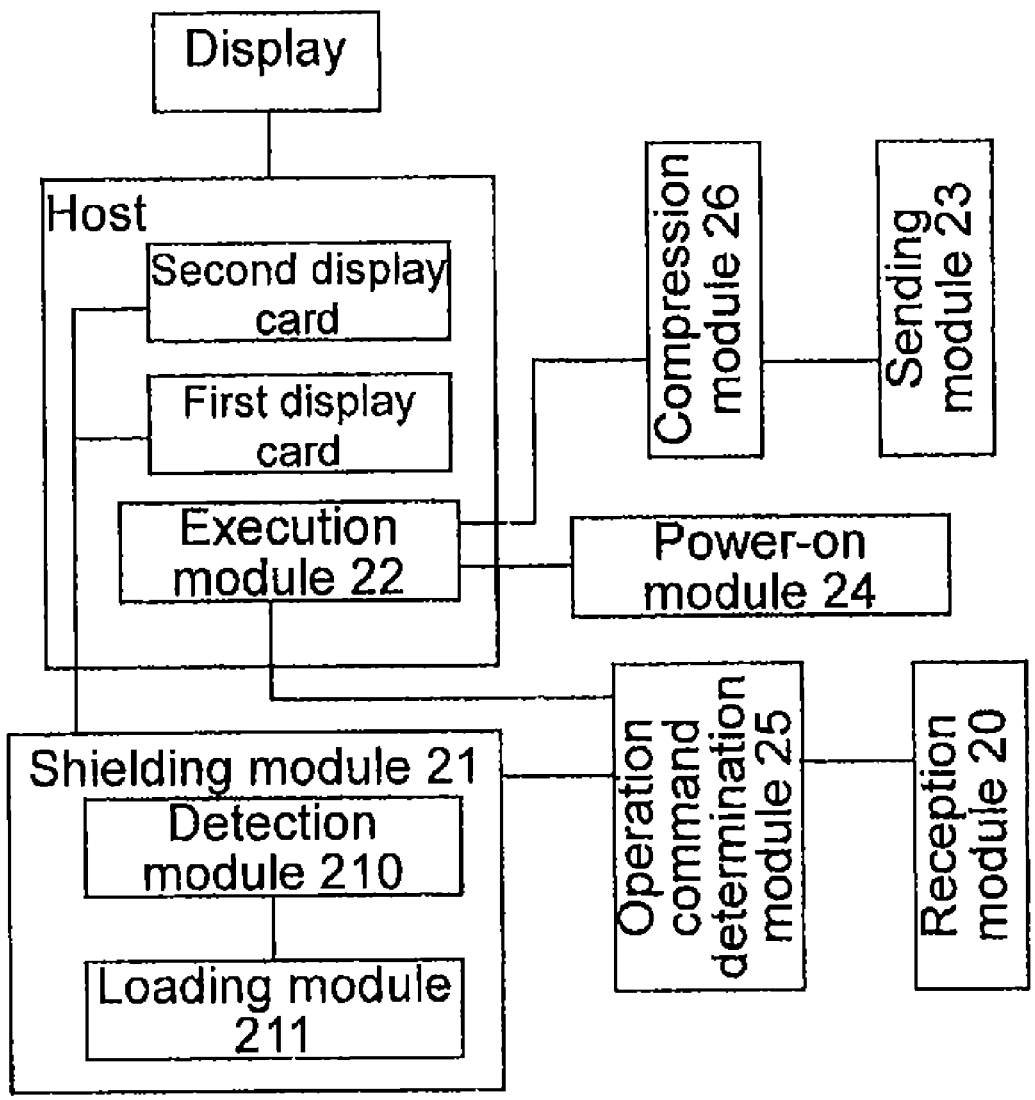
FIG. 2 is a schematic diagram of the composition structure of the apparatus for supporting remote control according to the invention.

FIG. 2 is a schematic diagram of the composition structure of the computer according to the invention. As illustrated in FIG. 2, the computer according to the invention comprises a host and a display, wherein a first display processing unit and a second display processing unit, i.e. two display cards, are provided in the host, one is a computer's on-board display card for processing local display image data, and the other is an extended display card specifically for processing display image data sent to the remote I/O terminal. The computer further comprises: a reception module 20, a shielding module 21, an execution module 22, a sending module 23, a power-on module 24 and an operation command determination module 25, wherein the reception module 20 is used for receiving an operation command from a remote data processing terminal. The reception module 20 can be a network card for supporting remote communication, a modem for supporting voice dialing, etc. The shielding module 21 is used for shielding the local display card of the computer. The reception module 20 parses the received operation command and then forwards it to a local processing center of the computer. Here, the operation command can be any command including a power-on command and a shut-down command, any command entered by any keyboard or a combination keyboards, and any command entered by a touch pad, touch screen or a mouse. It is to be noted that after receiving the operation command, the computer sends it to the operation command determination module 25 which determines whether the operation command is a power-on command, and if so, triggers the power-on module 24 to turn on the computer, and shields the local display card at the same time. The shielding module 21 comprises a detection module 210 and a loading module 211. The detection module 210 is used for detecting devices of the computer, e.g. the display cards, etc., and the loading module 211 is used for loading in the OS only a driver of the display card specifically for processing display image data sent to the remote I/O terminal. That is to say, if the computer is turned up by the remote I/O terminal, the local display card is shielded upon power-on. BIOS of the computer performs power-on self-check. When the two display cards of the computer are detected, only a driver of the display card specifically for processing display image data sent to the remote I/O terminal is loaded in the OS. After receiving the power-on command, the power-on module 24 short-connects a PS-ON pin of said computer's power supply with a grounding pin or sends a grounding signal to said PS-ON pin, and causes a PW-OK pin level to be lowered to thus turn on a power-on circuit. The execution module 22 is used for executing said operation command to obtain operation results. After the local operation command processing center of the computer receives the operation command, the center executes it as a local operation command to obtain execution results. Here, the execution results are mainly the data, e.g. a display image, audio data, etc., that is processed by the display card specifically for processing display image data sent to the remote I/O terminal after the operation command is executed by the processing center of the computer. The display image herein mainly refers to a desktop display image. The sending module 23 is used for sending said operation results to the remote data processing terminal. It should be understood by those skill in the art that the sending module 23 and the reception module 20 can be implemented together by network cards, modems for supporting voice dialing, etc, and they jointly constitute a communication module. It is to be noted that the communication module of the computer is required to support a passive operation mode, e.g. it is installed with a accumulator supply itself in order to still work after the computer is shut down. The communication module on the computer can also be individually supplied by a regular power supply, as long as it can be guaranteed that the communication module on the computer still has a working power supply after the computer is shut down. The remote I/O terminal is a pure I/O terminal and has hardly any information processing ability, except for the communication module provided thereon. The remote I/O terminal can be a touch screen, and can also be a combination of a keyboard and a display screen, a combination of a mouse and a display screen, a combination of a touch pad and a display screen, or a combination of a mouse, a keyboard and a display screen. The remote I/O terminal is connected with the computer through network links such as Internet, LAN, MAN, etc.

In order to cause the computer of the invention to have a better processing effect, the computer further comprises a compression module 26 that is connected with the sending module 23 and compresses the operation results of the remote command of the computer, i.e. display and audio data, to improve efficiency of data transmission.

It should be understood by those skill in the art that the respective modules illustrated in FIG. 2 can be functionally implemented by corresponding software or circuits.

According to the first embodiment of the present invention, in the step 102, when a power-on command is received from the network side of the computer, instead of pulling down the PS-ON pin of the computer's power supply to zero by grounding, other modes can be used for pulling down the PS-ON pin to a low-level threshold voltage which is less than 5V TTL. The level of the PW-OK pin is correspondingly pulled up, to thus cause the main power of the PC to begin operation.

According to the second embodiment of the present invention, when a power-on command is received by the power-on module 24, instead of pulling down the PS-ON pin of the computer's power supply to zero by grounding, other modes can be used for pulling down the PS-ON pin to a low-level threshold voltage which is less than 5V TTL. The level of the PW-OK pin is correspondingly pulled up, to thus cause the main power of the PC to begin operation.

Only preferred embodiments of the invention have been described above and are not intended to limit the protection scope of the invention.

What is claimed is:

1. A method for processing operation commands in a computer, said computer comprises a display and a host, wherein the host includes a first display processing unit for processing local display image data and a second display processing unit for processing display image data to be sent to a remote data processing terminal, comprising:
   receiving a first operation command from said remote data processing terminal, the first operation command being a power-on command;
   performing power-on of the computer;
   shielding said first display processing unit according to said first operation command, wherein shielding said first display processing unit comprises detecting said first display processing unit and said second display processing unit, and loading only a driver of said second display processing unit;
   receiving a second operation command from said remote data processing terminal, the second operation command being a command to obtain operation results;
   executing said second operation command to obtain operation results, said operation results being image data processed by said second display processing unit; and
   sending the operation results to the remote data processing terminal, for remote displaying.

2. The method according to claim 1, performing power-on of the computer comprising:
   short-connecting a PS-ON pin of the computer's power supply with a grounding pin or sending a grounding signal to said PS-ON pin, and causing a level of a PW-OK pin to be lowered, to thus turn on a power-on circuit.

3. A computer, said computer comprises a display and a host, wherein the host includes a first display processing unit for processing local display image data and a second display processing unit for processing display image data to be sent to a remote data processing terminal, comprising:
   a reception module, configured to receive a first operation command and a second operation command from the remote data processing terminal, the first operation command being a power-on command and the second operation command being a command to obtain operation results;
   a power-on module, configured to power-on the computer, based on the received first operation command;
   a shielding module, configured to shield said first display processing unit based on the received first operation command, wherein said shielding module detects said first display processing unit and said second processing unit and loads only a driver of said second display processing unit to shield said first display processing unit;

an execution module, configured to execute the received second operation command to obtain operation results, said operation results being image data processed by said second display processing unit; and a sending module, configured to send said operation results to said remote data processing terminal, for remote displaying.

4. The computer according to claim 3, wherein the power-on module short-connects a PS-ON pin of said computer's power supply with a grounding pin or sends a grounding signal to said PS-ON pin, and causes a PW-OK pin level to be lowered to thus turn on a power-on circuit, after receiving the power-on command.

5. The method according to claim 1, further comprising:

after the power-on command is received, a level of a PS-ON pin of the computer's power supply is pulled down, to thus turn on a power-on circuit.

6. The computer according to claim 3, wherein the power-on module pulls down a level of a PS-ON pin of said computer's power supply, to thus turn on a power-on circuit, after receiving the power-on command.

* * * * *